(12) United States Patent
Bengtsson et al.

(10) Patent No.: US 12,316,421 B2
(45) Date of Patent: May 27, 2025

(54) METHODS FOR BEAM CONTROL SIGNALLING, NETWORK NODES AND WIRELESS DEVICES

(71) Applicant: Sony Group Corporation, Tokyo (JP)

(72) Inventors: Erik Bengtsson, Lund (SE); Olof Zander, Lund (SE); Fredrik Rusek, Esloev (SE)

(73) Assignee: SONY GROUP CORPORATION, Tokyo (JP)

( * ) Notice: Subject to any disclaimer, the term of this patent is extended or adjusted under 35 U.S.C. 154(b) by 533 days.

(21) Appl. No.: 17/603,907

(22) PCT Filed: Apr. 30, 2020

(86) PCT No.: PCT/EP2020/062007
§ 371 (c)(1),
(2) Date: Oct. 14, 2021

(87) PCT Pub. No.: WO2020/225082
PCT Pub. Date: Nov. 12, 2020

(65) Prior Publication Data
US 2022/0200688 A1 Jun. 23, 2022

(30) Foreign Application Priority Data
May 3, 2019 (SE) .................... 1950529-6

(51) Int. Cl.
*H04B 7/06* (2006.01)
*H04W 16/28* (2009.01)
*H04W 24/10* (2009.01)

(52) U.S. Cl.
CPC ......... *H04B 7/0695* (2013.01); *H04B 7/0617* (2013.01); *H04W 16/28* (2013.01); *H04W 24/10* (2013.01)

(58) Field of Classification Search
CPC .. H04B 7/0408; H04B 7/0617; H04B 7/0628; H04B 7/068; H04B 7/0695; H04B 7/088;
(Continued)

(56) References Cited

U.S. PATENT DOCUMENTS

2013/0286960 A1  10/2013  Li
2017/0317866 A1  11/2017  Stirling-Gallacher
(Continued)

FOREIGN PATENT DOCUMENTS

CN  106797656 A  5/2017
CN  107925937 A  4/2018
(Continued)

OTHER PUBLICATIONS

ZTE, On NR power control, 3GPP TSG RAN WG1 #90 R1-1712312, Internet<URLhttp://www.3gpp.org/ftp/tsg_ran/WG1_RL1/TSGR1_90/Docs/R1-1712312.zip>, Aug. 25, 2017.
(Continued)

*Primary Examiner* — Michael Thier
*Assistant Examiner* — Prince A Mensah
(74) *Attorney, Agent, or Firm* — Tucker Ellis LLP (57) ABSTRACT

The present disclosure provides a method performed by a network node for beam control signalling. The network node is configured to communicate with a wireless device. The method comprises obtaining a first set of candidate beams from the wireless device for communication with the network node based on beam quality indicators. The method comprises determining a second set of candidate beams based on the first set and a number of beams to be used in the communication with the wireless device. The number of candidate beams of the second set is larger than the number of beams to be used for communication with the wireless
(Continued)

device. The method comprises transmitting, to the wireless device, control signalling indicative of the second set of candidate beams.

18 Claims, 6 Drawing Sheets

(58) Field of Classification Search
CPC .... H04B 17/336; H04W 16/28; H04W 24/08; H04W 28/10; H04W 52/281; H04W 72/21; H04W 72/046; H04W 76/0404
See application file for complete search history.

(56) References Cited

U.S. PATENT DOCUMENTS

| | | | |
|---|---|---|---|
| 2017/0331544 A1* | 11/2017 | Athley | H04B 7/0417 |
| 2018/0227094 A1* | 8/2018 | Liu | H04B 7/06966 |
| 2018/0331805 A1* | 11/2018 | Xia | H04B 7/088 |
| 2018/0367205 A1 | 12/2018 | Liu | |
| 2019/0053271 A1* | 2/2019 | Islam | H04W 52/281 |
| 2019/0132851 A1 | 5/2019 | Davydov | |
| 2019/0239202 A1* | 8/2019 | Bhattad | H04W 24/08 |
| 2019/0386726 A1* | 12/2019 | Fresia | H04B 7/0408 |
| 2020/0154474 A1* | 5/2020 | Lo | H04B 7/0617 |
| 2020/0162144 A1* | 5/2020 | Zhou | H04B 7/0628 |
| 2020/0169995 A1* | 5/2020 | Nam | H04W 72/21 |
| 2020/0228186 A1* | 7/2020 | Zhu | H04B 7/088 |
| 2020/0259574 A1* | 8/2020 | Huang | H04W 72/046 |
| 2020/0260428 A1* | 8/2020 | Xu | H04W 76/27 |
| 2020/0267536 A1* | 8/2020 | Zhou | H04B 7/0404 |
| 2020/0322949 A1* | 10/2020 | Akkarakaran | H04B 7/0695 |
| 2020/0374930 A1* | 11/2020 | Tang | H04B 17/336 |
| 2021/0160714 A1* | 5/2021 | Shi | H04W 28/10 |

FOREIGN PATENT DOCUMENTS

| | | |
|---|---|---|
| CN | 108401264 A | 8/2018 |
| CN | 108476050 A | 8/2018 |
| WO | 2013039352 A2 | 3/2013 |
| WO | WO-2016095984 A1 | 6/2016 |
| WO | WO-2017217898 A1 | 12/2017 |
| WO | WO-2018000405 A1 | 1/2018 |
| WO | 2018034713 A1 | 2/2018 |
| WO | 2019004885 A1 | 1/2019 |

OTHER PUBLICATIONS

International Search Report and Written Opinion from corresponding International Application No. PCT/EP2020/062007, mailed on Jan. 13, 2021, 25 pages.
Office Action and Search Report from corresponding Swedish Application No. 1950529-6, mailed on Dec. 20, 2019, 10 pages.
Qualcomm Incorporated, "Enhancement on Multi-beam Operation," 3GPP TSG-RAN WG1 Meeting #96-Bis, R1-1905027, Apr. 8-12, 2019, 26 pages.
Zte, "Enhancement on multi-beam operation," 3GPP TSG RAN WG1 Meeting #96, R1-1901635, Feb. 25-Mar. 1, 2019, 18 pages.
Nokia et al., "Enhancements on Multi-beam Operation," 3GPP TSG RAN WG1 Meeting #94-bis, R1-1811408, Oct. 8-12, 2018, 14 pages.
Vivo,"Further discussion on multi beam operation", 3GPP TSG RAN WG1 #96bis R1-1904097.tsgr1_96b, Apr. 8, 2019.
Qualcomm Incorporated, "Enhancements on Multi-beam Operation", R1-1813443, 3rd Generation Partnership Project (3GPP),MoblieCompetence Centre;650,route des Lucioles;F-06921Sophia-Antipolis Cedex;France,Publishing date:Nov. 12, 2018, URL:http://www.3gpp.org/ftp/Meetings%5F3GPP%5FSYNC/RAN1/Docs/R1%2D1813443%2Ezip;whole document.

* cited by examiner

METHODS FOR BEAM CONTROL SIGNALLING, NETWORK NODES AND WIRELESS DEVICES

The present disclosure pertains to the field of wireless communications. The present disclosure relates to methods for beam control signalling, related network nodes and wireless devices.

BACKGROUND

In wireless communications, nowadays, a wireless device may include an increasing number of physical antenna panels. For example, a wireless device (for example a user equipment, UE) may have a plurality of a physical antenna panels, e.g., one at its back, one in the front, and some at the sides. Each physical antenna panel activated consumes power, even when the wireless device is in idle mode.

There is a need for reducing the power consumption of the wireless device while still maintaining the radio performance of the wireless device. However, this may be a complicated task due to the increasing number of physical antenna panels included in the wireless device.

SUMMARY

Furthermore, the above scenario may become even more complicated due to the fact that a physical antenna panel comprises one or more panels such as one or more antenna sub-arrays. For example, a physical antenna panel may be e.g. a module with multiple antenna arrays with different properties. A panel may be e.g. a single array of antennas. In order to reduce the power consumption, it may be beneficial to power off one or more physical antenna panels that momentarily may not be needed for communication. However, given the complex hardware and software implementation of the transceiver of the UE, it is a complicated task to select which antenna panel to power off while maintaining the radio performance and possibly beam correspondence.

In the context of the 3GPP radio access technology New Radio, beams are used for communication between the wireless device and a network node, such as a base station. Each beam of the wireless device is associated with a panel of a physical antenna panel, and therefore the selection of beams for communication also influences which physical antenna panels are needed for communication.

Accordingly, there is a need for network nodes, wireless devices and methods for beam control signalling, which address, mitigate, or alleviate the shortcomings existing and enable a flexibility in beam control signalling for an improved selection of one or more beams to be used in communication between the wireless device and a network node.

The present disclosure provides a method performed by a network node for beam control signalling. The network node is configured to communicate with a wireless device. The method comprises obtaining a first set of candidate beams from the wireless device for communication with the network node based on beam quality indicators. The method comprises determining a second set of candidate beams based on the first set and a number of beams to be used in the communication with the wireless device. The number of candidate beams of the second set is larger than the number of beams to be used for communication with the wireless device. The method comprises transmitting, to the wireless device, control signalling indicative of the second set of candidate beams.

Further, a network node is provided, the network node comprising: a memory circuitry, a processor circuitry, and a wireless interface, wherein the network node is configured to perform any of the methods.

The disclosed network node can improve the beam control signalling by determining and indicating to the wireless device candidate beams of the second set that maintain or enhance the radio performance of the wireless device and that are more numerous than the number of beams to be used, which allows flexibility at the wireless device. The flexibility provided by the second set of candidate beams permits the wireless device to make further optimizations to achieve power efficiency.

The present disclosure provides a method, performed by a wireless device, for beam control signalling. The wireless device comprises one or more physical antenna panels, wherein each physical antenna panel comprises one or more panels, wherein the wireless device is configured to communicate, with a network node, using one or more beams associated with corresponding one or more panels. The method comprises receiving, from the network node, control signalling indicative of a set of candidate beams; and selecting, among the set of candidate beams, one or more beams for communication with the network node based on a hardware property of the wireless device.

Further, a wireless device is provided, the wireless device comprising: a memory circuitry, a processor circuitry, and a wireless interface. The wireless device is configured to perform any of the methods disclosed herein.

The present disclosure enables the wireless device to select, based on the hardware property, one or more beams among the set of candidate beams having satisfactory radio performance so as to increase the chances of being able to power off one or more of its physical antenna panels. A further advantage is that performing beams can be selected for communication and can permit one or more physical antenna panels to be powered off without sharing any hardware details with the network node (which is advantageous from a standardization perspective, and from a bandwidth usage perspective). Allowing to deactivate one or more physical antenna panels may lead to saving battery power at the wireless device. Further, for example, the disclosed wireless device is able to meet a desired quality of service metrics (e.g. delay in a low latency service or context) by selecting one or more redundant beams based on the redundant beams sharing the same physical antenna panel(s). For example, the disclosed wireless device can turn off one or more physical antenna panels to save power while still having redundant beams available for fast switching and avoiding any delay caused by the activation of the one or more physical antenna panels.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

As mentioned above, it is of general interest in wireless communications to reduce the power consumption of wireless devices while still maintaining the radio performance of the wireless devices. However, this may be complicated due to fact that each wireless device may have a plurality of physical antenna panels, and each physical antenna panel activated consumes power (even when the wireless device is in idle mode).

Furthermore, the scenario may become even more complex due to the fact that a physical antenna panel comprises one or more panels (e.g. one or more antenna arrays, e.g. one or more antenna sub-arrays). For example, a physical antenna panel may be e.g. a module with multiple antenna arrays with different properties. A panel may be e.g. a single array of antennas. It is to be noted that the physical antenna panel disclosed herein refers to a hardware antenna module or a logic structure (e.g. logic element, and/or software module) associated with a hardware antenna module. In other words, a panel may be seen as a logical device that transmits one corresponding beam in one or more embodiments. In contrast, in one or more embodiments, the physical antenna panel may be seen a physical device that may transmit several beams. For example, the physical antenna panel as a physical device may have one single power supply/line. In other words, the panels belonging to one physical antenna panel typically share the same power line or power source and may therefore not be powered on/off independently of each other.

Accordingly, reducing power consumption while maintaining radio performance may be complicated due to fact that the wireless device may have a plurality of physical antenna panels, wherein each physical antenna panel comprises one or more panels and each physical antenna panel activated consumes power (even when the wireless device is in idle mode).

Furthermore, a multibeam operation from the wireless device's perspective presents some limitations related to beam combinations that can be operated simultaneously (handled by different panels of the wireless device) and beam combinations that require multiple physical antenna panels to be active simultaneously.

A multibeam operation can involve a multi-stream operation, and/or diversity by simultaneous transmission (e.g. power sharing), and/or switch diversity (e.g. maintaining beam redundancy or having spare beams for use).

It may be advantageous that the wireless device does not share detailed information about the hardware configuration (e.g. in relation with the physical antenna panel(s) configuration with respect to panel(s)) with the network node. From a standardization perspective, it is advantageous not to require for the wireless device (and the vendor of the wireless device) to disclose the hardware configuration of the wireless device to the network node for e.g. determining beams that allows power efficiency at the wireless device. Furthermore, this may be advantageous is saving resources or bandwidth that may be consumed by the transmission of the hardware configuration to the network node.

In the present disclosure, the wireless device is capable of selecting uplink (UL) beams from a set of candidate beams (e.g. a candidate list) shared by the network node. This may be done without having to communicate the hardware configuration of the wireless device to the network node.

At the wireless device, a downlink (DL) beam corresponds to a receive (Rx) beam while an UL beam corresponds to a transmit (Tx) beam.

At the network node, when the network node is configured to communicate with the wireless device using a set a beams, a DL beam corresponds to a transmit (Tx) beam while an UL beam corresponds to a receive (Rx) beam.

It is to be noted that when a wireless device can select an uplink beam for transmission to a network node autonomously based on a downlink reference signal (DL RS) from the network node, the 3rd Generation Partnership Project (3GPP) work defines that beam correspondence (BC) holds.

$3^{rd}$ Generation Partnership Project, 3GPP, systems can operate with Tx/Rx beam correspondence at the network node (e.g. gNB, and/or Transmission Reception point, TRP) and at the wireless device, so called UE, according to the following rules.

Tx/Rx beam correspondence at TRP holds if at least one of the following is satisfied:
  TRP is able to determine a TRP Rx beam for the uplink reception based on UE's downlink measurement on TRP's one or more Tx beams.
  TRP is able to determine a TRP Tx beam for the downlink transmission based on TRP's uplink measurement on TRP's one or more Rx beams Tx/Rx beam correspondence at UE holds if at least one of the following is satisfied:
  UE is able to determine a UE Tx beam for the uplink transmission based on UE's downlink measurement on UE's one or more Rx beams.
  UE is able to determine a UE Rx beam for the downlink reception based on TRP's indication based on uplink measurement on UE's one or more Tx beams.

Beam correspondence may be seen as the ability of the UE to select a suitable beam for UL transmission based on DL measurements with or without relying on UL beam sweeping. Stated differently, it may be seen as the ability of UE to choose the uplink beam autonomously based on DL measurements.

In 3GPP 5G New Radio systems, during an initial stage (assuming beam correspondence holds at the side of the wireless device), the wireless device can measure a DL beam sweep and establishes a radio link on one or more of the stronger beams (such as on the strongest beam). The wireless device can report a DL beam candidate list to the network node. In case the wireless device does not have beam correspondence (for example, the wireless device is not able to select an UL beam based on DL measurements on UE DL beams), the following can occur: a) the wireless device can, based on the initial DL beam sweep of the network node, populate the DL beam candidate list with the transmit (Tx) beams of the network node (the DL beam candidate list can contain the network node's DL beams (Tx beams, or DL beam identifiers) associated with a corresponding signal strength indication); b) the wireless device can perform an UL beam sweep in response (and optionally shares the DL beam candidate list with the network node and the selected (strongest) first DL beam of the network node (using e.g. the corresponding beam identifier).

In both scenarios, (for example, with beam correspondence or not), the network node can determine the UL (Tx) beams to be used by the wireless device and can inform the wireless device of the determination.

However, the network may determine the UL (Tx) beams to be used by the wireless device, which are not optimal for the wireless device. For example, when multiple UL beams are to be activated, the number of physical antenna panels that are to be active may be sub-optimal for the wireless device. The sub-optimal determination of the UL beams of the wireless device is likely to occur when the network node does not hold information regarding the hardware properties of the wireless device.

The present disclosure provides that the network node provides a set of candidate beams to the wireless device which is then capable of selecting the beams to be used for communication based on the wireless device hardware property (e.g. an association between a physical antenna panel and a panel generating the beam selected).

In the present disclosure, the number of physical antenna panels in the UE that have to be active are to be minimized according to one or more embodiments. The disclosed wireless device supports the minimization by selecting beams (amongst the beams indicated by the network node due to their satisfactory performance) that belong to the same physical antenna panels. The present disclosure proposes that the network node indicates to the wireless device a set of candidate beam larger than the number of beams to be used by the wireless device. This way, the wireless device is capable of identifying a set of physical antenna panels (e.g. the smallest possible set of physical antenna panels) from which there are signals of sufficient quality to meet performance criterion.

The figures are schematic and simplified for clarity, and they merely show details which aid understanding the disclosure, while other details have been left out.

Throughout, the same reference numerals are used for identical or corresponding parts.

Figure 1A:
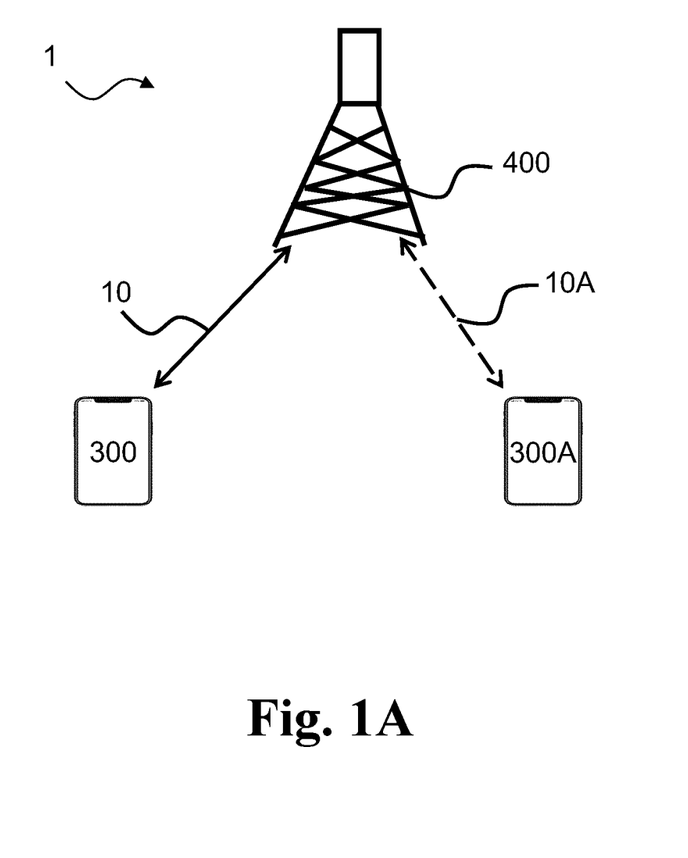
FIG. 1A is a diagram illustrating an exemplary wireless communication system comprising an exemplary network node and an exemplary wireless device according to this disclosure.

FIG. 1A is a diagram illustrating an exemplary wireless communication system 1 comprising an exemplary network node 400 and an exemplary wireless device 300 according to this disclosure.

As discussed in detail herein, the present disclosure relates to a wireless communication system 1 comprising a cellular system, e.g. a 3$^{rd}$ Generation Partnership Project (3GPP) wireless communication system, e.g. millimetre wave communication. The wireless communication system 1 comprises a wireless device 300 and/or a network node 400.

A network node disclosed herein refers to radio network node, and/or a radio access network node operating in the radio access network, such as a base station, an evolved Node B, eNB, gNB.

The wireless communication system 1 described herein may comprise one or more wireless devices 300, 300A, and/or one or more network nodes 400, such as one or more of: a base station, an eNB, a gNB and/or an access point.

A wireless device may refer to as a mobile device and/or a user equipment, UE.

The wireless device 300, 300A may be configured to communicate with the network node 400 via a wireless link (or radio access link) 10, 10A.

Figure 1B:
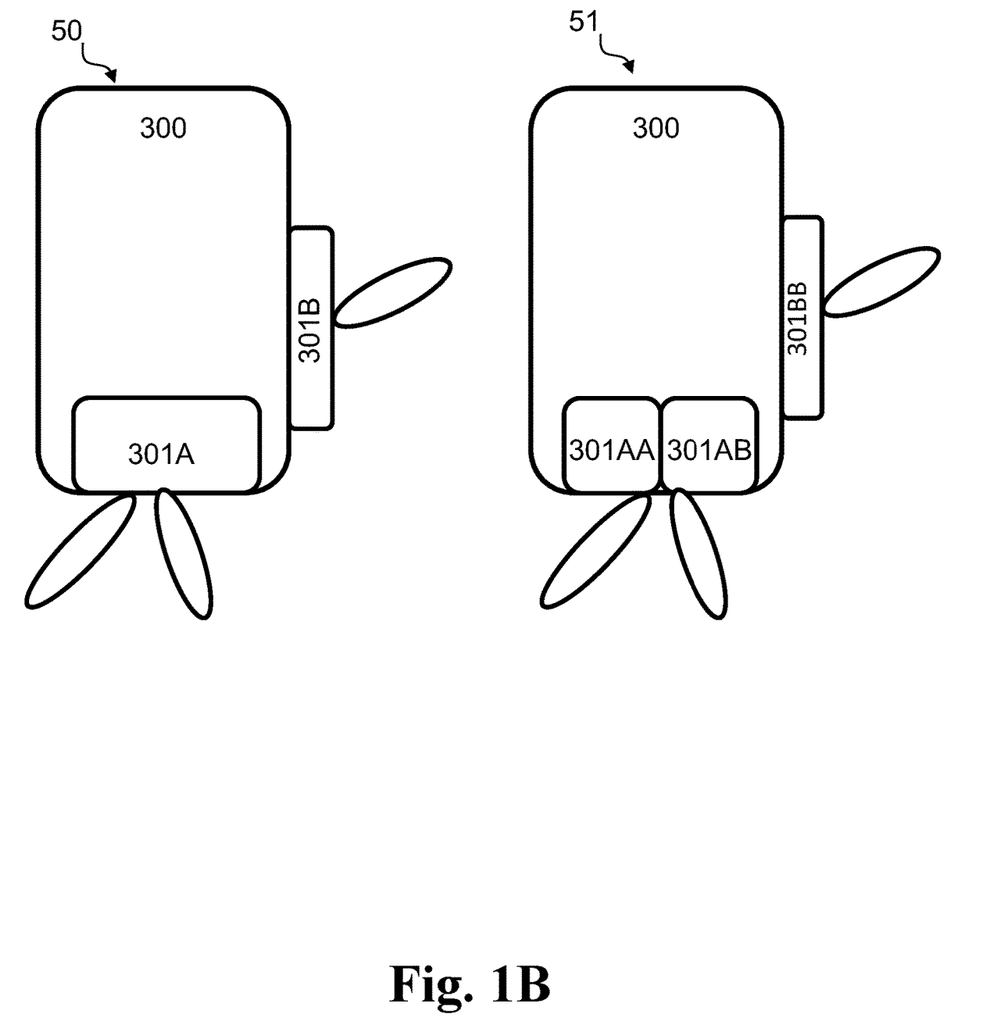
FIG. 1B is a diagram illustrating example physical antenna panels and example panels according to this disclosure.

FIG. 1B is a diagram illustrating example physical antenna panels and example panels according to this disclosure.

It is to be noted that the physical antenna panel disclosed herein refers to a hardware antenna circuitry or a logic structure (e.g. logic element, and/or software circuitry) associated with a hardware antenna circuitry.

The panel as disclosed herein may be a hardware element in one or more embodiments. The panel as disclosed herein may be a logic element (e.g. an abstract element, logic element, and/or software circuitry) configured to transmit one beam at a time and to select one beam amongst a plurality of beams in one or more embodiments. In other words, a panel may be seen as a logical device that transmits one corresponding beam in one or more embodiments. In contrast the physical antenna panel may be seen a physical device that may transmit several beams. For example, the physical antenna panel as a physical device typically has one single power supply/line. In other words, the panels belonging to one physical antenna panel typically share the same power line or power source and can therefore not be powered on/off independently of each other.

Illustration 50 shows a wireless device 300 comprising a first physical antenna panel 301A and a second physical antenna panel 301B. The first physical antenna panel 301A is capable of transmitting two beams (e.g. using two Tx spatial filters). The second physical antenna panel 301B is capable of transmitting one beam (e.g. using one Tx spatial filter).

Illustration 51 shows the wireless device 300 wherein the first physical antenna panel 301A comprises a first panel 301AA and a second panel 301AB. In other words, the first panel 301AA and the second panel 301AB are associated with the first physical antenna panel 301A. The second physical antenna panel 301B comprises a panel 301BB. The panel 301BB is associated with the second physical antenna panel 301B.

In an illustrative example, the network node observes that the beam strengths are (on a relative scale): 10, 8, 9, for panel 301AA, 301AB, and 301BB, respectively. For two spatial layers, this leads to a case where the network node selects beams corresponding to panels 301AA and 301BB which have superior strengths over panel 301AB. At the wireless device, this does not lead to any deactivation of any of the physical antenna panels because panel 301AA belongs to the first physical antenna panel 301A, and the first physical antenna panel 301A has to remain active and powered for the beam of panel 301AA while panel 301BB belongs to the second physical antenna panel 301B and the second physical antenna panel 301B has to remain active and powered for the beam of panel 301BB.

The disclosed network node indicates to the wireless device a set of candidate beam (so called second set of candidate beams in FIG. 2) larger than the number of beams to be used by the wireless device. Following the example, the disclosed network node transmits control signalling indicative of a set of candidate beams (so called second set of candidate beams in FIG. 2) from the network node to the wireless device. In the example of the three panels 301AA, 301AB, 301BB having beam strengths of: 10, 8, 9 respectively, the network node transmits control signalling indicative of 3 beams corresponding to panel 301AA, 301AB and 301BB respectively. Upon receipt of the control signalling, the wireless device may select, based on the set and the hardware property (in this example the association between the physical panels and the panels generating the respective beams), beams corresponding to panel 301AA and 301AB to enable a deactivation of the second physical antenna panel 301B.

The disclosed wireless device has minimized the number of active physical antenna panels by selecting beams that belong to the same physical antenna panels. This way, the wireless device is capable of identifying a set of physical antenna panels (e.g. the smallest possible set of physical antenna panels) from which there are beams and signals of sufficient quality to meet performance criterion.

Figure 2:
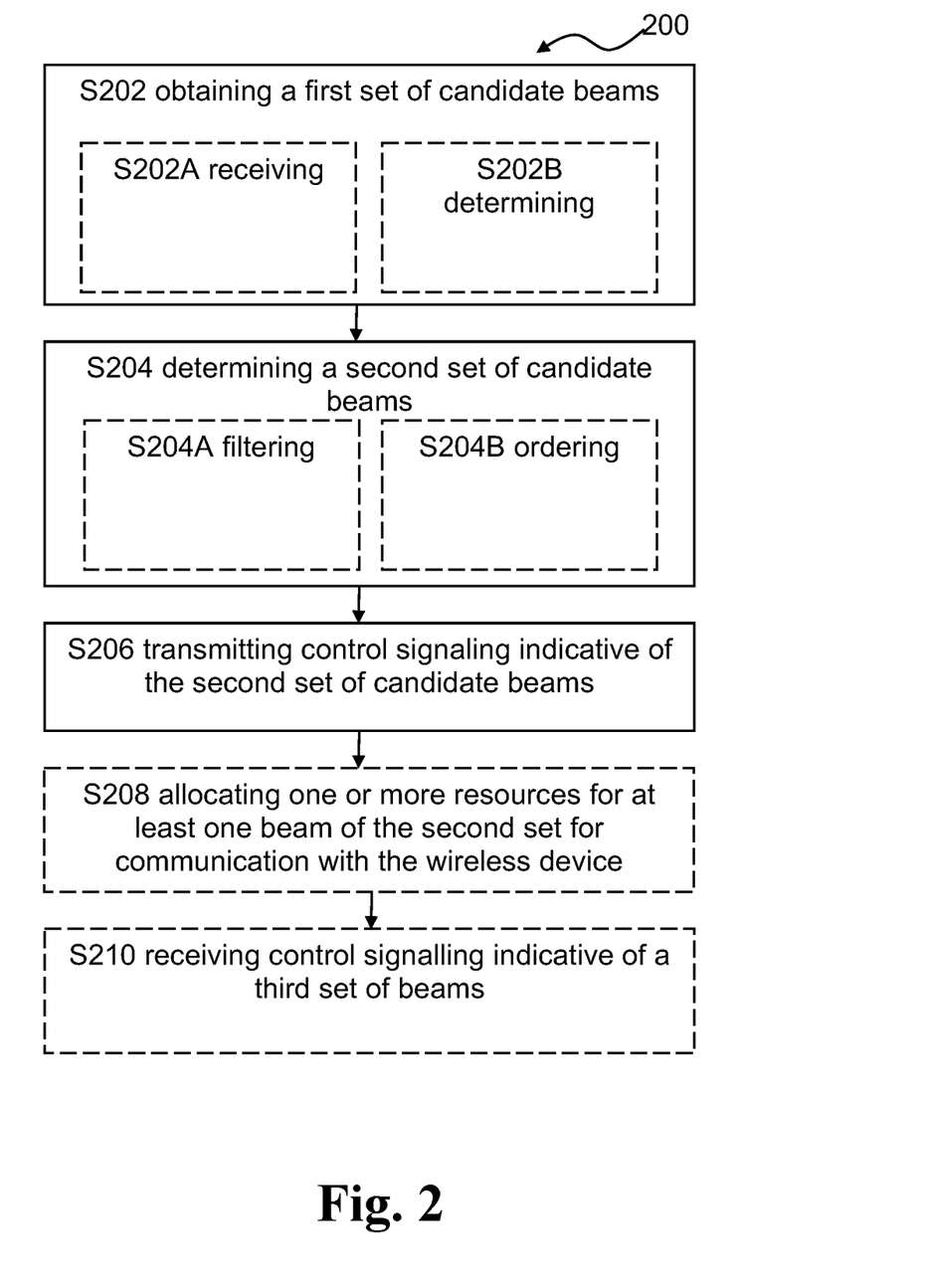
FIG. 2 is a flow-chart illustrating an exemplary method, performed by a network node, for beam control signalling according to this disclosure.

FIG. 2 shows a flow diagram of an exemplary method 200 for beam control signalling according to the disclosure. The method 200 is performed by a network node.

The network node is configured to communicate with a wireless device.

It is to be noted that initial access has been completed between the network node and the wireless device prior to performing method 200 and beam correspondence is first assumed to be at the wireless device.

The method 200 comprises obtaining S202 a first set of candidate beams from the wireless device for communication with the network node based on beam quality indicators. Obtaining S202 the first set of candidate beams from the wireless device comprises for example receiving control signalling indicative of the first set of candidate beams from the wireless device. Obtaining S202 the first set of candidate beams from the wireless device comprises for example determining the first set of candidate beams based on the beam quality indicators. Beam quality indicators include for example signal strength indicators and/or signal-to-interference-and-noise ratio.

In one or more embodiments, a set may comprise one or more elements. In one or more embodiments, the first set of candidate beams may comprise a plurality of candidate beams.

The method 200 comprises determining S204 a second set of candidate beams based on the first set and a number of beams to be used in the communication with the wireless device. The number of candidate beams of the second set is larger than the number of beams to be used for communication with the wireless device.

A number of beams to be used in the communication with the wireless device may comprise for example a number of spatial filters to be used, and/or a number of directions of radiated signals and/or a number of polarizations to be used.

In one or more embodiments, the selected beam may be configured to carry one or more data streams and/or one or more layers to be used.

In one or more embodiments, the second set of candidate beams may comprise a plurality of candidate beams.

In one or more embodiments, the one or more candidate beams of the second set comprise one or more of: a downlink, DL, beam, and an uplink, UL, beam. For example, the UE can make a final UL beam selection based on a proposed selection of beams shared by the network node via control signalling indicative of the second set.

The method 200 comprises transmitting S206, to the wireless device, control signalling indicative of the second set of candidate beams. Transmitting S206 control signalling indicative of the second set of candidate beams comprises optionally transmitting to the wireless device one or more control signals indicative of the second set of candidate beams. Optionally, transmitting S206 control signalling indicative of the second set of candidate beams comprises optionally transmitting to the wireless device one or more control signals comprising the second set.

The network node advantageously provides a set of candidate beams (i.e. the second set) to the wireless device which satisfies at least the number of beams to be used in the communication with the wireless device and allows the wireless device to select the beam(s) to be used for communication based on the wireless device hardware property. For example, the UE can make a final UL beam selection based on a proposed selection of beams shared by the network node via control signalling indicative of the second set.

In one or more example methods, the second set of candidate beams is ordered by prioritizing the candidate beams of the second set. In one or more example methods, the second set is determined by filtering the first set based on a prioritization of the candidate beams of the first set. For example, for multi beam operation, the network node is configured to send back the second set, optionally including a filtered (e.g. prioritized) set of beam(s) for multi beam operation and to allocate UL resources for each beam that may be selected by the wireless device. For example, the filtered set of beams may comprise a set of UL beams (e.g. UE Tx beams) which are filtered based on the measured performance at the network node. For example, the second set of beams may comprise a set of candidate beams (e.g. UL beams (e.g. UE Tx beams)) in a prioritized order. For example, the second set of beams may comprise a set of UL beams (e.g. UE Tx beams) prioritized based on the measured performance at the network node (e.g. ordered according to the measure performance, e.g. in decreasing order of performance). In other words, the wireless device can then select what beam(s) to use, (depending on physical antenna panel setup and/or power arrangement of the physical antenna panels) and respond by addressing associated resources allocated by the network node. Power arrangement of the physical antenna panels relates to the arrangement of the one or more power lines and/or power sources feeding the physical antenna panels.

In one or more example methods, the second set is a proper subset of the first set. In other words, the second set may be smaller than the first set. Stated differently, the number of candidate beams of the second set is smaller than the number of candidate beams of the first set. In one or more example methods, the second set as a proper subset of the first set is determined by reducing the first set, e.g. to fit a maximum number of beams. In one or more example methods, the second set as a proper subset of the first set is determined by filtering the first set based on the beam quality indicators. The network node is still in control and can thereby limit the size of the second set in scenarios e.g. when there is dense traffic in the cell.

In one or more example methods, the second set of candidate beams is ordered by prioritizing the candidate beams of the second set. For example, the second set is determined by prioritizing the candidate beams of the first set. For example, the second set may include candidate beams ordered according to a priority order. In other words, the second set is for example a prioritized set of beams, determined based on the first set. For example, the second set is determined by prioritizing the candidate beams of first set for multi-beam operation.

In one or more example methods, the second set is determined by filtering the first set based on a prioritization of the candidate beams of the first set. For example, the network node can filter the first set to obtain the second set which indicates to the wireless device, which candidate beams are acceptable with some prioritization.

In one or more example methods, the second set is ordered by prioritizing the candidate beams of first set based on a system quality metric. In other words, the second set may be a set of beams prioritized based on a system quality metric. For example, the priority order may be based on the system quality metric.

It may be appreciated that the network node can then benefit from an improved resource allocation to beams which maintain or enhance the radio performance of the wireless device and an improved multibeam operation, compared a non-prioritised set of beams. The network node may be seen as enabling the wireless device to select one or more beams amongst the prioritized set of beams (e.g. based on system performance), which may in turn allow the wireless device to judiciously select antenna panel(s) to deactivate for reducing power consumption.

In one or more example methods, the second set is determined by filtering S204A the first set based on a system quality metric. For example, the first set is filtered based on the system quality metric by selecting, to be part of the second set, the candidate beams of the first set providing a received signal strength parameter satisfying a performance criterion (e.g. higher than a threshold). In other words, filtering S204A the first set based on the system quality metric may comprise filtering the first set to obtain a second set comprising one or more candidate beams with system quality parameters which are advantageous (e.g. lower interference level, higher received signal strength etc.) For example, the system quality parameter comprises one or more of: a cell traffic parameter, an interference parameter, a power level parameter, a signal strength parameter, and a beam group capacity parameter. For example, the system quality parameter comprises one or more of: a received signal strength, number of UEs in the cell, interference level in the cell, interference level with neighbour cells, beam correlation or beam group capacity, network node hardware limitations, power level, and power delay. Filtering S204A may be seen as reducing the first set based on the system quality metric, e.g. reducing the number of candidate beams of the first set based on the system quality metric so as to have a second set comprising candidate beams with favourable performances.

In one or more example methods, the second set is determined by ordering S204B the first set based on the system quality metric. Ordering S204B may be performed on the filtered first set resulting from S204A. Optionally, filtering S204A may be performed on an ordered first set resulting from S204B.

In one or more example methods, candidate beams from the wireless device for communication with the network node comprise downlink candidate beams of the network node.

In one or more example methods, obtaining S202 the first set of candidate beams based on beam quality indicators comprises receiving S202A control signalling indicative of a set of downlink, DL, beam candidates of the network node.

For example, the DL candidate beams comprise Tx candidate beams of the network node, such as Tx beams of the network node (which are proposed by the wireless device as candidate beams).

For example, the DL candidate beams comprise Rx candidate beams of the wireless device.

In one or more example methods, candidate beams from the wireless device for communication with the network node comprise uplink candidate beams. For example, the uplink candidate beams comprise Tx candidate beams of the wireless device. For example, the uplink candidate beams comprise Rx candidate beams of the network node, such as Rx beams of the network node (which are proposed by the wireless device as candidate beams).

In one or more example methods, candidate beams comprise a beam pair, such as a Tx beam of the wireless device paired with an Rx beam of the network node, such as a Rx beam of the wireless device paired with the Tx beam of the network node. For example, in other words, candidate beams comprise one or more beam pairs, wherein a beam pair comprises a Rx beam of a receiver device and a Tx beam of a transmitter device. In some embodiments, the Rx beam of the receiver device is a Rx beam of a network node, for example in UL communication, while the Tx beam of the transmitter device is a Tx beam of the wireless device. In some embodiments, the Rx beam of the receiver device is a Rx beam of the wireless device, for example in DL communication, while the Tx beam of the transmitter device is a Tx beam of the network node.

In one or more example methods, candidate beams comprise DL candidate beams corresponding to the beams of the network node, such as Tx beams. In one or more example methods, candidate beams comprise uplink candidate beams corresponding to the beams of the network node, such as Rx beams. For example, the uplink candidate beams comprise Rx candidate beams of the network node, such as Rx beams of the network node proposed by the wireless device as candidate beams. In one or more example methods, obtaining S202 the first set of candidate beams based on beam quality indicators comprises determining S202B a set of uplink, UL, candidate beams based on a UL beam sweeping performed by the wireless device. For example, the first set of candidate beams comprises a set of DL candidate beams to be used by the network node, such as Rx beams of the network node for receiving UL communication from wireless device. In other words, the wireless device can determine (such as select) a first set of feasible beams, and provides the first set to the network node.

In one or more example methods, the method 200 comprises allocating S208 one or more resources for at least one beam of the second set for communication with the wireless device.

In one or more example methods, the method 200 comprises receiving S210 control signalling indicative of a third set of beams selected by the wireless device for communication with the network node. For example, the third set of beams may comprise an updated list of beams, which corresponds to beams that the wireless device is about to use for communication with the network node. The updated list of beams are the beams that the wireless device selected based on the hardware property and that the wireless device intends to use for communication with the network node. In other words, the number of beams of the third set of beams may be equal to the number of beams to be used for communication.

In one or more example methods, the method 200 comprises allocating a respective uplink resource for each candidate beam of the second set.

In one or more example methods, the method 200 comprises receiving, using the respective uplink resource, control signalling indicative of the third set of beams selected by the wireless device (300) for communication with the network node (400). It may be appreciated that the resources used for control signalling indicative of the third set may be less than the resources allocated for the third set.

In one or more example methods, the system quality parameter comprises one or more of: a cell traffic parameter, an interference parameter, a power level parameter, a signal strength parameter, and a beam group capacity parameter.

In an illustrative example where beam correspondence has not been achieved in initial access, the network node populates the first set (e.g. an UL beam candidate list and/or a DL candidate list) and filters the first set to obtain a second set. The network node can determine whether a multi beam operation is to be applied in the communication with the wireless device, and informs the wireless device of the determination of the multi beam operation. The network node can allocate UL resources for each of the available UE UL beams (in the second set). The network node can share the second set (e.g. filtered list(s) based on the DL beam the UE selected in the first set). For example, the network node can share the second set (e.g. filtered list(s) based on the DL beam (e.g. DL beam used by the network node, e.g. the Tx beam of the network node) that the UE selected in the first set). Upon receipt of control signalling indicative of the second set, the wireless device can perform a selection of DL and UL beams based on hardware property of the wireless device, e.g.: what beams to use by addressing the associated UL resources and again shares a third set (e.g. an updated DL list reflecting its preferences). This allows the wireless device to select any of the UL and DL beam combinations available in the second set for multibeam operations.

Figure 3:
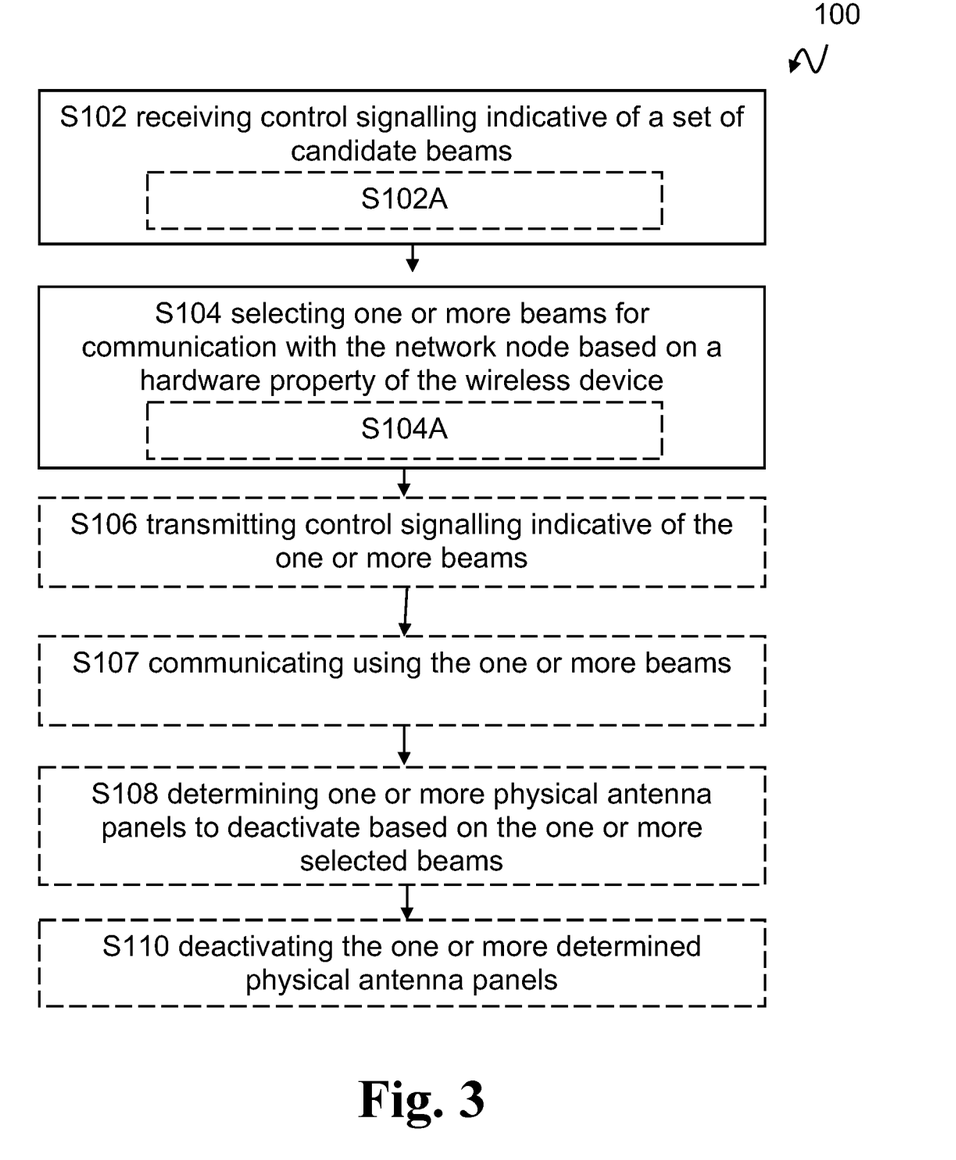
FIG. 3 is a flow-chart illustrating an exemplary method, performed by a wireless device of a wireless communication system according to this disclosure.

FIG. 3 shows a flow diagram of an exemplary method 100 for beam control signalling according to the disclosure. The method 100 is performed by a wireless device. The wireless device comprises one or more physical antenna panels. Each physical antenna panel comprises one or more panels. The wireless device is configured to communicate, with a network node, using one or more beams associated with corresponding one or more panels. It is to be noted that the physical antenna panel disclosed herein refers to a hardware antenna circuitry or a logic structure (e.g. logic element, and/or software circuitry) associated with a hardware antenna circuitry.

The wireless device is configured to communicate, with a network node, using one or more beams controlled by the wireless device and one or more beams controlled by the network node. For example, the wireless device is configured to communicate, with a network node, using one or more DL beams and/or one or more UL beams. At the wireless device, a DL beam corresponds to a receive (Rx) beam while an UL beam corresponds to a transmit (Tx) beam. At the network node, when the network node is configured to communicate with the wireless device using a set a beams, a DL beam corresponds to a transmit (Tx) beam while an UL beam corresponds to a receive (Rx) beam.

In one or more example methods, the one or more beams used for communication between the wireless device and the network node are associated with corresponding one or more panels. In one or more example methods, the one or more beams comprise a beam pair, such as a Tx beam of the wireless device paired with an Rx beam of the network node, such as a Rx beam of the wireless device paired with the Tx beam of the network node. A beam pair comprises a Rx beam of a receiver device and a Tx beam of a transmitter device. In some embodiments, the Rx beam of the receiver device is a Rx beam of a network node, for example in UL communication, while the Tx beam of the transmitter device is a Tx beam of the wireless device. In some embodiments, the Rx beam of the receiver device is a Rx beam of the wireless device, for example in DL communication, while the Tx beam of the transmitter device is a Tx beam of the network node.

In one or more example methods, the method comprises transmitting, to the network node, control signalling indicative of a first set of candidate beams. This may correspond to S202, and/or S202A of FIG. 2. For example, the UE can indicate candidate beam(s) to the network node.

The panel as disclosed herein may be a hardware element in one or more embodiments. The panel as disclosed herein may be a logic element (e.g. an abstract element, logic element, and/or software circuitry) configured to transmit one beam at a time and to select one beam amongst a plurality of beams in one or more embodiments. In other words, a panel may be seen as a logical device that transmits one corresponding beam in one or more embodiments. In contrast the physical antenna panel may be seen a physical device that may transmit several beams. For example, the physical antenna panel as a physical device typically has one single power supply/line. In other words, the panels belonging to one physical antenna panel typically share the same power line or power source and can therefore not be powered on/off independently on each other.

The method 100 comprises receiving S102, from the network node, control signalling indicative of a set of candidate beams. In other words, the set of candidate beams received in S102 corresponds to the second set of candidate beams transmitted via control signalling by the network node (e.g. in S206 of FIG. 2).

The set of candidate beams may comprise one or more beams of the network node and/or one or more beams of the wireless device. The set of candidate beams may comprise one or more DL beams and/or one or more UL beams.

The set of candidate beams may comprise a set of candidate beams which has been filtered, for example ordered, for example prioritized. The set of candidate beams may comprise a set of candidate beams which has been filtered, for example ordered, for example prioritized according to a system quality metric, by the network node.

The method 100 comprises selecting S104, among the set of candidate beams, one or more beams for communication with the network node based on a hardware property of the wireless device. In one or more example methods, the hardware property is indicative of an association between a respective panel and a corresponding physical antenna panels and/or of power arrangement related to the physical antenna panels. The association between a panel and a corresponding physical antenna panel may be in form of a panel identifier associated with a physical antenna identifier. A beam may be characterized by a beam identifier, possibly associated with a panel identifier.

In other words, the wireless device can then select what beam(s) to use, (depending on physical antenna panel setup and/or power arrangement) and respond by addressing associated resources allocated by the network node. This may lead to deactivation of unused physical antenna panels and a reduction of power consumption by using beams such that the wireless device may disable one or more physical antenna panels.

In one or more embodiments, the one or more beams selected by the wireless device may include a beam determined at initial access.

In one or more embodiments, the set of candidate beams may comprise a primary set of UL candidate beams and/or a secondary set of DL candidate beams.

In one or more embodiments, the set of candidate beams may comprise one or more UL candidate beams and/or one or more DL candidate beams.

In one or more example methods, the method 100 comprises transmitting S106, to the network node, control signalling indicative of the one or more beams selected by the wireless device for communication with the network node. For example, the one or more beams may comprise an updated list.

In one or more example methods, the method 100 comprises communicating S107 (e.g. transmitting and/or receiving) with the network node using the one or more selected beams.

In one or more example methods, the method 100 comprises determining S108 one or more physical antenna panels to deactivate based on the one or more selected beams (and optionally based on an association between the one or more physical antenna panels and the one or more panels associated with the selected one or more beams). In one or more example methods, the method 100 comprises deactivating S110 the one or more determined physical antenna panels.

In one or more example methods, receiving S102, from the network node, control signalling indicative of a set of candidate beams comprises receiving S102A, from the network node, one or more control messages comprising one or more identifiers indicative of one or more candidate beams of the set of candidate beams.

In one or more example methods, the one or more beams for communication with the network node comprise one or more of: a downlink, DL, beam, and an uplink, UL, beam.

In one or more example methods, selecting S104, among the set of candidate beams, one or more beams for communication with the network node based on a hardware property of the wireless device comprises selecting S104A, among the set of candidate beams, the one or more beams for communication with the network node based on a relation between UL and DL beams. The relation between UL and DL beams may be based on a beam correspondence between a DL beam and an UL beam. For example, the relation between UL and DL beams may correspond to presence of beam correspondence between a given UL beam and a given DL beam.

Figure 4:
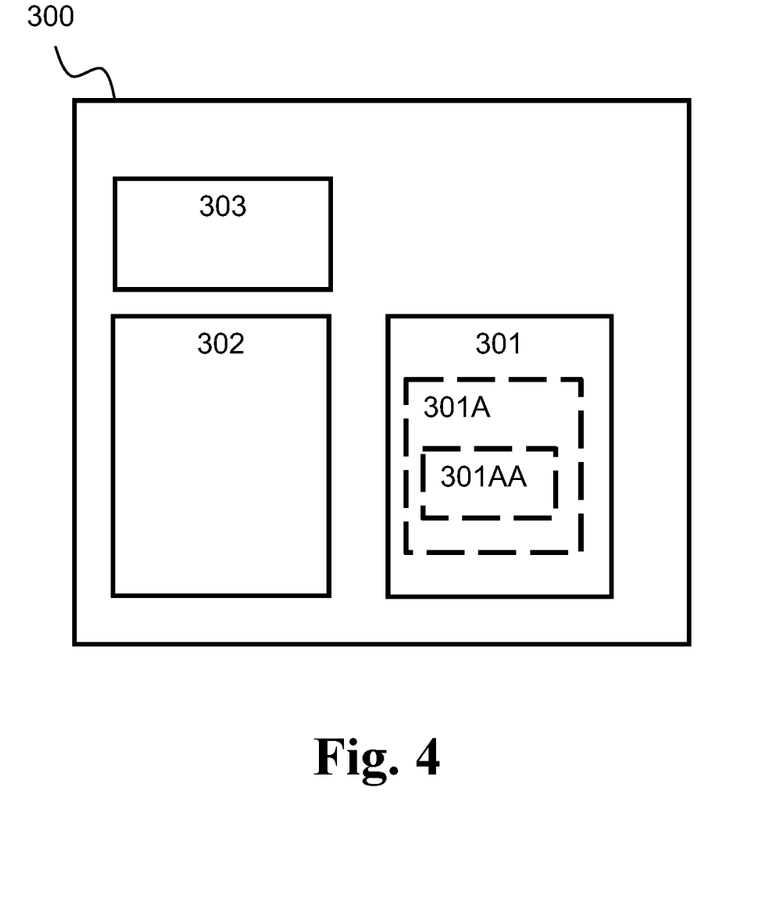
FIG. 4 is a block diagram illustrating an exemplary wireless device according to this disclosure.

FIG. 4 shows a block diagram of an exemplary wireless device 300 according to the disclosure. The wireless device 300 comprises a memory circuitry 301, a processor circuitry 302, and a wireless interface 303. The wireless device 300 may be configured to perform any of the methods disclosed in FIG. 3.

The wireless device 300 is configured to communicate with a network node, such as the network node disclosed herein, using a wireless communication system. The wireless interface 303 is configured for wireless communications via a wireless communication system, such as a 3GPP system, such as a 3GPP system supporting millimetre-wave communications.

The wireless device comprises one or more physical antenna panels including a first physical antenna panel 301A, wherein the first physical antenna panel 301A is configured to communicate, with a network node, using one or more panels including a first panel 301AA.

The wireless device 300 is configured to receive, via the wireless interface 303, from the network node, control signalling indicative of a set of candidate beams. The set of candidate beams corresponds to the second set of candidate beams indicated in the control signalling transmitted by the network node.

The wireless device 300 is configured to select, via the processor circuitry 302, among the set of candidate beams, one or more beams for communication with the network node based on a hardware property of the wireless device 300. In one or more example methods, the hardware property is indicative of an association between panels and the physical antenna panels and/or of power arrangement related to the physical antenna panels.

Advantageously, the wireless device is capable of selecting beams that permit to power off one or more of the physical antenna panels without sharing any hardware implementation details with the network node.

The processor circuitry 302 is optionally configured to perform any of the operations disclosed in FIG. 3 (e.g. S102A, S104A, S106, S107, S108, S110). The operations of the wireless device 300 may be embodied in the form of executable logic routines (e.g., lines of code, software programs, etc.) that are stored on a non-transitory computer readable medium (e.g., the memory circuitry 303) and are executed by the processor circuitry 302).

Furthermore, the operations of the wireless device 300 may be considered a method that the wireless circuitry is configured to carry out. Also, while the described functions and operations may be implemented in software, such functionality may as well be carried out via dedicated hardware or firmware, or some combination of hardware, firmware and/or software.

The memory circuitry 303 may be one or more of a buffer, a flash memory, a hard drive, a removable media, a volatile memory, a non-volatile memory, a random access memory (RAM), or other suitable device. In a typical arrangement, the memory circuitry 303 may include a non-volatile memory for long term data storage and a volatile memory that functions as system memory for the processor circuitry 303. The memory circuitry 303 may exchange data with the processor circuitry 302 over a data bus. Control lines and an address bus between the memory circuitry 303 and the processor circuitry 302 also may be present (not shown in FIG. 4). The memory circuitry 303 is considered a non-transitory computer readable medium.

The memory circuitry 303 may be configured to store the association in a part of the memory based on the received software data.

Figure 5:
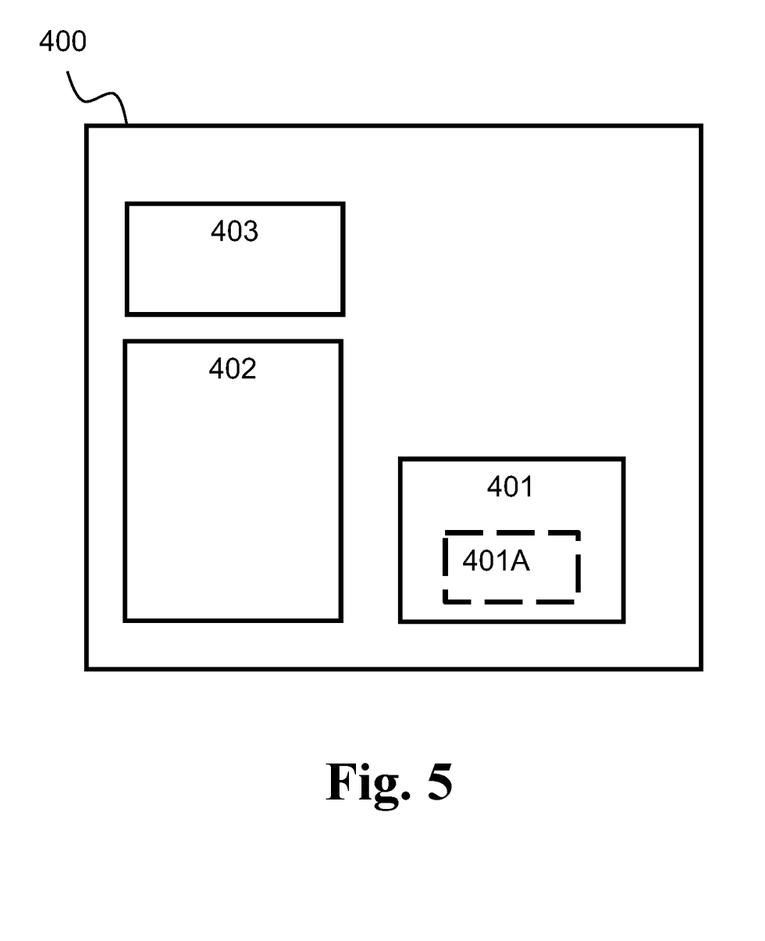
FIG. 5 is a block diagram illustrating an exemplary network node according to this disclosure.

FIG. 5 shows a block diagram of an exemplary network node 400 according to the disclosure. The network node 400 comprises a wireless interface 401, a processor circuitry 402, and a memory circuitry 403. The network node 400 may be configured to perform any of the methods disclosed in FIG. 2.

The network node 400 is configured to communicate with a wireless device, such as the wireless device disclosed herein, using a wireless communication system. The wireless interface 403 is configured for wireless communications via a wireless communication system, such as a 3GPP system, such as supporting millimetre wave communications.

The wireless interface 401 may comprise an antenna array 401A comprising a plurality of antenna array elements. The network node 400 is optionally configured to communicate (via the wireless interface 401), using a set of beams (e.g. radiated by 401A), with a wireless device. The network node 400 is optionally configured to communicate (via the wireless interface 401), using an omnidirectional antenna with a wireless device.

The network node 400 is configured to obtain, via the wireless interface 401 and/or the processor circuitry 402, a first set of candidate beams from the wireless device for communication with the network node based on beam quality indicators.

The processor circuitry 402 is configured to determine a second set of candidate beams based on the first set and a number of beams to be used in the communication with the wireless device, wherein the number of candidate beams of the second set is larger than the number of beams to be used for communication with the wireless device.

The wireless interface 401 is configured to transmitting, to the wireless device, control signalling indicative of the second set of candidate beams.

The processor circuitry 402 is optionally configured to perform any of the operations disclosed in FIG. 2 (e.g. S202A, S202B, S204A, S204B, S208, S210). The operations of the network node 400 may be embodied in the form of executable logic routines (e.g., lines of code, software programs, etc.) that are stored on a non-transitory computer readable medium (e.g., the memory circuitry 403) and are executed by the processor circuitry 402).

Furthermore, the operations of the network node 400 may be considered a method that the wireless circuitry is configured to carry out. Also, while the described functions and operations may be implemented in software, such functionality may as well be carried out via dedicated hardware or firmware, or some combination of hardware, firmware and/or software.

The memory circuitry 403 may be one or more of a buffer, a flash memory, a hard drive, a removable media, a volatile memory, a non-volatile memory, a random access memory (RAM), or other suitable device. In a typical arrangement, the memory circuitry 403 may include a non-volatile memory for long term data storage and a volatile memory that functions as system memory for the processor circuitry 403. The memory circuitry 403 may exchange data with the processor circuitry 402 over a data bus. Control lines and an address bus between the memory circuitry 403 and the processor circuitry 402 also may be present (not shown in FIG. 5). The memory circuitry 403 is considered a non-transitory computer readable medium.

Embodiments of methods and products (network node and wireless device) according to the disclosure are set out in the following items:

1. A method, performed by a network node, for beam control signalling, wherein the network node is configured to communicate with a wireless device, the method comprising:
    obtaining (S202) a first set of candidate beams from the wireless device for communication with the network node based on beam quality indicators;
    determining (S204) a second set of candidate beams based on the first set and a number of beams to be used in the communication with the wireless device, wherein the number of candidate beams of the second set is larger than the number of beams to be used for communication with the wireless device; and
    transmitting (S206), to the wireless device, control signalling indicative of the second set of candidate beams.

2. The method according to item 1, wherein the second set is a proper subset of the first set.

3. The method according to any of the previous items, wherein the second set is determined by filtering (S204A) the first set based on a system quality metric.

4. The method according to any of the previous items, wherein the second set is determined by ordering (S204B) the first set based on the system quality metric.

5. The method according to any of the previous items, wherein candidate beams for communication with the network node comprise downlink candidate beams,
    and wherein obtaining (S202) the first set of candidate beams based on beam quality indicators comprises receiving (S202A) control signalling indicative of a set of downlink, DL, candidate beams.

6. The method according to any of the previous items, wherein candidate beams for communication with the network node comprise uplink candidate beams, and
    wherein obtaining (S202) the first set of candidate beams based on beam quality indicators comprises determining (S202B) a set of uplink, UL, candidate beams based on a UL beam sweeping performed by the wireless device.

7. The method according to any of the previous items, the method comprising:
    allocating (S208) one or more resources for at least one beam of the second set for communication with the wireless device.

8. The method according to any of the previous items, the method comprising: receiving (S210) control signalling indicative of a third set of beams selected by the wireless device for communication with the network node.

9. The method according to any of items 3-8, wherein the system quality parameter comprises one or more of: a cell traffic parameter, an interference parameter, a power level parameter, a signal strength parameter, and a beam group capacity parameter.

10. A method, performed by a wireless device, for beam control signalling, the wireless device comprising one or more physical antenna panels, wherein each physical antenna panel comprises one or more panels, wherein the wireless device is configured to communicate, with a network node, using one or more beams associated with corresponding one or more panels, the method comprising:
    receiving (S102), from the network node, control signalling indicative of a set of candidate beams; and
    selecting (S104), among the set of candidate beams, one or more beams for communication with the network node based on a hardware property of the wireless device.

11. The method according to item 10, wherein the hardware property is indicative of an association between a respective panel and the corresponding physical antenna panel and/or of power arrangement related to the physical antenna panels.

12. The method according to any of items 10-11, the method comprising:
    transmitting (S106), to the network node, control signalling indicative of the one or more beams selected by the wireless device for communication with the network node.

13. The method according to any of items 10-12, the method comprising:
    determining (S108) one or more physical antenna panels to deactivate based on the one or more selected beams; and deactivating (S110) the one or more determined physical antenna panels.

14. The method according to any of items 10-13, wherein receiving (S102), from the network node, control signalling indicative of a set of candidate beams comprising:
   receiving (S102A), from the network node, one or more control messages comprising one or more identifiers indicative of one or more candidate beams of the set of candidate beams.

15. The method according to any of items 10-14, wherein the one or more beams for communication with the network node comprise one or more of: a downlink, DL, beam, and an uplink, UL, beam.

16. The method according to any of items 10-15, wherein selecting (S104), among the set of candidate beams, one or more beams for communication with the network node based on a hardware property of the wireless device comprises selecting (S104A), among the set of candidate beams, the one or more beams for communication with the network node based on a relation between UL and DL beams.

17. A network node comprising a memory circuitry, a processor circuitry, and a wireless interface, wherein the network node is configured to perform any of the methods according to any of items 1-9.

18. A wireless device comprising a memory circuitry, a processor circuitry, and a wireless interface, wherein the wireless device is configured to perform any of the methods according to any of items 10-16.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-5 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

The invention claimed is:

1. A method, performed by a network node, for beam control signaling, wherein the network node is configured to communicate with a wireless device, the method comprising:
   obtaining a first set of candidate beams, from the wireless device, for communication with the network node based on beam quality indicators, the first set of candidate beams based on a hardware capability of the wireless device;
   determining a second set of candidate beams based on the first set and a number of beams to be used in the communication with the wireless device, wherein the second set of candidate beams is determined by reducing the first set of candidate beams such that the second set of candidate beams is a proper subset of the first set of candidate beams, the number of candidate beams of the second set is larger than the number of beams to be used for communication with the wireless device; and
   transmitting, to the wireless device, control signaling indicative of the second set of candidate beams, wherein the wireless device is configured to select, among the second set of candidate beams, one or more beams for communication with the network node based on a hardware property of the wireless device, the hardware property is indicative of an association between a respective panel and a corresponding physical antenna panel or of power arrangement related to the physical antenna panels, each physical antenna panel comprises one or more panels.

2. The method according to claim 1, wherein the second set of candidate beams is ordered by prioritizing the candidate beams of the second set.

3. The method according to claim 1, wherein the second set is determined by filtering the first set based on a prioritization of the candidate beams of the first set.

4. The method according to claim 1, wherein the second set is determined by filtering the first set based on a system quality metric.

5. The method according to claim 4, wherein the second set is determined by ordering the first set based on the system quality metric.

6. The method according to claim 1, wherein the one or more candidate beams of the second set comprise one or more of: a downlink, DL, beam, and an uplink, UL, beam.

7. The method according to claim 1, wherein the candidate beams from the wireless device for communication with the network node comprise downlink candidate beams of the network node, and
wherein obtaining the first set of candidate beams based on beam quality indicators comprises receiving control signaling indicative of a set of downlink, DL, candidate beams of the network node.

8. The method according to claim 1, wherein candidate beams for communication with the network node comprise uplink candidate beams, and
wherein obtaining the first set of candidate beams based on beam quality indicators comprises determining a set of uplink, UL, candidate beams based on a UL beam sweeping performed by the wireless device.

9. The method according to claim 1, the method comprising:
allocating one or more resources for at least one candidate beam of the second set for communication with the wireless device.

10. The method according to claim 9, the method comprising receiving, using the respective uplink resource, control signaling indicative of the third set of beams selected by the wireless device for communication with the network node.

11. The method according to claim 1, the method comprising: receiving control signaling indicative of a third set of beams selected by the wireless device for communication with the network node.

12. The method according to claim 11, the method comprising:
allocating a respective uplink resource for each candidate beam of the second set.

13. A method, performed at a wireless device, for beam control signaling, the wireless device comprising one or more physical antenna panels, wherein each physical antenna panel comprises one or more panels, wherein the wireless device is configured to communicate, with a network node, using one or more beams associated with corresponding one or more panels, the method comprising:
receiving, from the network node, control signaling indicative of a set of candidate beams;
selecting, among the set of candidate beams, one or more beams for communication with the network node based on a hardware property of the wireless device, wherein the hardware property is indicative of an association between a respective panel and a corresponding physical antenna panel and/or of power arrangement related to the physical antenna panels; and
transmitting, to the network node, control signaling indicative of the one or more beams selected by the wireless device for communication with the network node.

14. The method according to claim 13, wherein the hardware property is indicative of an association between a respective panel and a corresponding physical antenna panel and/or of power arrangement related to the physical antenna panels.

15. The method according to claim 13, the method comprising:
determining one or more physical antenna panels to deactivate based on the one or more selected beams; and
deactivating the one or more determined physical antenna panels.

16. The method according to claim 13, wherein receiving, from the network node, control signaling indicative of a set of candidate beams comprising:
receiving, from the network node, one or more control messages comprising one or more identifiers indicative of one or more candidate beams of the set of candidate beams.

17. The method according to claim 16, wherein the one or more beams for communication with the network node comprise one or more of: a downlink, DL, beam, and an uplink, UL, beam.

18. The method according to claim 13, wherein selecting, among the set of candidate beams, one or more beams for communication with the network node based on a hardware property of the wireless device comprises selecting, among the set of candidate beams, the one or more beams for communication with the network node based on a relation between UL and DL beams.

* * * * *